United States Patent [19]
Klein et al.

[11] Patent Number: 6,114,054
[45] Date of Patent: Sep. 5, 2000

[54] METHOD FOR COLORING CERAMIC SURFACES

[75] Inventors: Thomas Klein, Heidelberg; Thomas Staffel, Grünstadt; Jürgen Straub, Mannheim; Lysander Fischer, Rauenberg, all of Germany

[73] Assignee: BK Giulini Chemie GmbH & Co., Ludwigshafen, Germany

[21] Appl. No.: 09/142,824

[22] PCT Filed: Jan. 13, 1998

[86] PCT No.: PCT/EP98/00136

§ 371 Date: Dec. 15, 1998

§ 102(e) Date: Dec. 15, 1998

[87] PCT Pub. No.: WO98/31647

PCT Pub. Date: Jul. 23, 1998

[30] Foreign Application Priority Data

Jan. 15, 1997 [DE] Germany .......................... 197 01 080

[51] Int. Cl.[7] .............................. B32B 9/00; B05D 1/38; B05D 3/02
[52] U.S. Cl. ................ 428/689; 427/376.2; 427/376.3; 427/383.5; 427/419.2; 427/419.3; 427/419.8
[58] Field of Search ............................. 427/376.2, 376.3, 427/383.5, 419.2, 419.3, 419.8; 106/31.27, 31.28, 31.9; 428/689

[56] References Cited

U.S. PATENT DOCUMENTS

| 3,950,316 | 4/1976 | Witt | 260/88.2 R |
|---|---|---|---|
| 5,256,600 | 10/1993 | Pfitzenmaier | 501/4 |
| 5,273,575 | 12/1993 | De Saint Romain | 106/23 B |
| 5,300,324 | 4/1994 | Croft et al. | 427/376.2 |
| 5,419,824 | 5/1995 | Weres et al. | 204/268 |
| 5,599,520 | 2/1997 | Garces | 423/700 |

FOREIGN PATENT DOCUMENTS

| 2605651A1 | 8/1977 | Germany . |
| 3109927A1 | 9/1982 | Germany . |
| 97/38952 | 10/1997 | WIPO . |

*Primary Examiner*—Shrive Beck
*Assistant Examiner*—Michael Barr
*Attorney, Agent, or Firm*—Venable; George H. Spencer; Ashley J. Wells

[57] ABSTRACT

A method for coloring a surface of a ceramic mass to produce a colored ceramic body includes providing a host lattice material composed of a colorless metal oxide compound which crystallizes into one of a spinel lattice or a rutile lattice and which may be water soluble; providing an aqueous coloring solution containing water; a first water soluble compound including a metal ion which is one of a two-valent metal ion or a three-valent metal ion and which colors the host lattice material; and a second water soluble compound including a metal ion which is one of a five-valent metal ion or six-valent metal ion and which provides electrostatic balance; generating a mixed-phase pigment in the surface of the ceramic mass by one of (i.) working a fine powder of the colorless metal oxide into the ceramic mass and applying the aqueous coloring solution onto at least one surface of the ceramic mass, or (i.i.) adding a water soluble colorless metal oxide compound to the aqueous coloring solution in an amount effective to form a mixture having a preselected viscosity and applying this mixture to the surface of the ceramic mass; drying the solution; and firing the ceramic body at a temperature ranging from 300 to 1400° C. for a duration ranging from 0.5 to 5 hours.

13 Claims, No Drawings

METHOD FOR COLORING CERAMIC SURFACES

BACKGROUND OF THE INVENTION

1. Field of the Invention

The subject-matter of the present invention is a new method for the subsequent coloring of ceramic bodies by inserting chromophoric metal ions into host lattices in a ceramic body, as well as the ceramic bodies produced with this method.

2. Description of the Related Art

For the coloring of ceramic materials, only refractory pigments can be considered since colored glazes are fired on at temperatures of 700 to 1100° C. and sanitary ceramics are fired on at 1400° C. The pigments used in particular are colored oxides of iron, chromium, manganese, pure phases and mixed phases with a spinel structure, e.g. compounds of Al, Ni, Cr, Zn, Co, Cu, Mn, Fe, U and V, a number of silicates, sulfides and mixed phases with chromophoric cations in colorless host lattices of the rutile type such as $TiO_2$, $SnO_2$, $ZrO_2$, $ZrSiO_4$ and $PbO_2$. It is possible to produce nearly all prevailing colors as refractory pigments by selecting the base materials, their concentration in the mixed phases and the production conditions. The oxidic mixed-phase pigments, which are particularly esteemed because of their brilliance, are composed of a stable, colorless oxide lattice, normally of the spinel type ($Me^{2+}Me_2^{3+}O_4$ or $Me_2^{2+}Me^{4+}O_4$ as basic formula) or the rutile type, such as $TiO_4$, $SnO_2$, $ZrO_2$, $ZrSiQ_4$, $PbO_2$ into which the chromophoric cations of other metals that effect the color are inserted. Crystallochemically, these are mixed crystals. The rutile-type mixed oxides, which are of particular interest in this connection, generally contain nickel, cobalt, chromium, copper, manganese, iron or vanadium as chromophoric cation and antimony, niobium or tungsten as higher-valence metal ions for a valence compensation of these two-valence or three-valence ions relative to the four-valence rutile ion to be replaced. These oxidic mixed-phase pigments are produced principally by firing the respective oxidic components in the solid state at temperatures ranging from 800 to 1400° C., wherein the more reactive the components used are, that is to say the more finely they are dispersed and the better they are mixed, the easier the solid-state reaction progress becomes. The starting components are frequently produced from aqueous solutions through a joint precipitation of hydroxides or carbonates. The formation temperature of the oxidic mixed-phase pigments can be reduced by adding mineralizers (e.g. lithium chloride or sodium chloride), thus making it possible to avoid the heavy sintering through forming of large pigments, which otherwise can easily occur at high temperatures (compare Ullmann's Enc. of Technical Chemistry, $4^{th}$ edition (1979), Vol. 18, pp 599–628; DE-AS 19 03 755; U.S. Pat. No. 3,022,186; magazine: "Angewandte Chemie" [Applied Chemistry] 1/1962, pp 23–27 and cfi/Ber. DKG 4/1993, pp 146–148). With respect to the particularly interesting yellow pigments containing Ni and Cr as coloring ions, we want to refer to the DE-OS-24 16 347; the DE-OS-26 05 651 and the U.S. Pat. No. 2 992 123.

For the coloring of ceramics, these pigments are placed either together with glass-forming substances, the so-called frit, onto the prefired ceramic and are melted or sintered together with this ceramic (glazing or enamel), or, depending on the mechanical stress, are applied to or burnt into the glaze (so-called melt pigments or overglaze pigments) or are applied to the ceramic body and subsequently coated with a glaze (underglaze pigments). The so-called engobe technique is used to produce non-glazed ceramics, for which a refined suspension of clay minerals mixed with the pigments is applied as a thin layer to the ceramic material and is then fired on. A thorough coloring of the total ceramic material is normally ruled out because of the high cost of the pigments. The great advantage of the engobe technique is that it produces not only a thin surface coloration, but that the ceramic material is provided with a thoroughly colored surface layer, so that a rough and uneven surface can be made smooth through grinding and polishing, without removing the color. The disadvantage of this method is that in each case the total surface is coated with the colored layer and a pattern can therefore not be applied.

In order to apply color patterns to non-glazed ceramics, attempts have been made for some time to apply at a later date solutions of chromophoric metal compounds onto the fired ceramic surface, so that these can penetrate into the surface and will result in a surface layer interspersed with the colored metal oxides that form, following the drying and burning process. For a pink coloration, compare the DE-OS 195 46 325 and for a black coloration the DE-OS 196 25 236. Even though the number of coloring options based on this variation of the technique is high and a higher number of colors can be produced, the range of colors is limited through the limitation to oxidic colors. It is not possible in this way to produce colors with mixed-oxide pigments of the rutile and spinel type because it would not be possible to dissolve sufficient concentrations of the various starting minerals side-by-side and such that they are stable in uniform solutions and because the suspensions with finished pigments do not penetrate deeply enough into the ceramic surface.

In accordance with the DE 31 09 927, the salts or oxides of various chromophoric metals as such are applied in a printing process to the ceramics and produce the corresponding color each by itself. A joint application is also addressed there, but more along the lines of forming mixed colors or applying them side-by-side to create corresponding colored pictures. Example 2 describes the application of a layer of zirconium oxide glaze. However, the rutile pigments cannot form here since, on the one hand, only one metal ion is applied respectively (copper or cobalt), which is not sufficient for the mixed-phase formation and, on the other hand, the $ZrO_2$ in zirconium oxide glazes is not contained in defined crystals with a rutile structure, but as undercooled, glass-type melt in a mixture with the other glazing components.

The object therefore was to find a new method for producing oxidic mixed-phase pigments in a ceramic surface layer, wherein the method also allows a partial coloring of the surface layer.

SUMMARY OF THE INVENTION

This object is solved by providing a method for coloring ceramic surfaces, and a ceramic material produced thereby in which the method is characterized in that a mixed-phase pigment of a colorless metal oxide that crystallizes into the spinel or rutile lattice as host lattice and a watery color solution, containing a soluble compound of a two-valent or three-valent metal ion that colors the host lattice and a soluble compound of a five-valent or six-valent metal ion for electrostatic balance, is generated in the surface layer of the ceramic mass in that either the colorless oxide in a finely distributed form is worked into the ceramic mass and the watery coloring solution is applied to the surface layer, or that the watery coloring solution is laced with a sufficient amount of a soluble compound of the metal ions forming the host lattice and this mixture is applied to the surface, and that following the drying of the solution, the ceramic body is fired at 300 to 1400° C. for a duration of 0.5 to 5 hours.

The host lattice may be formed by a rutile lattice composed of $TiO_2$, $SnO_2$, $ZrO_2$ or $ZrSiO_4$. The host lattice may be contained as a fine powder in amounts ranging from 2 to 10%, particularly 5%. The host lattice may is produced through repeated saturation with a solution of a soluble compound of the metal ions forming the host lattice and subsequent drying.

The coloring solution advantageously contains 1 to 10 weight %, preferably 5 to 8%, of the respective metal ion compounds. The coloring compounds are advantageously selected from the groups Ni, Co and Cr as well as Sb, Nb and W. The coloring solution may contain additional mineralizers. The coloring solution may additionally contain a coordinated titanium, particularly potassium titanium oxalate.

The saturation solution for forming the mixed-phase pigment may advantageously contains respectively 1–3% of the three-valent and five-valent ions and 3–8% of dihydroxybis(ammoniumlactato) titanate.

DESCRIPTION OF THE PREFERRED EMBODIMENTS

The engobe mass according to the invention is mixed in the standard way from finely ground clay, containing sodium feldspar or potassium feldspar, powdered quartz as well as viscosity-regulating means such as silicates or acrylates by adding 2 to 10, preferably about 5 weight %, of the colorless oxide crystallizing in the spinel or rutile lattice, wherein the individual components are preferably ground separately owing to their differing hardness, to obtain the degree of fineness necessary for processing. A fineness of grinding of less than 0.1 mm, preferably below 0.05 mm, as is standard for such engobe techniques, can be used for the invention as well. The clay mass suspended in water can be applied to the ceramic blanks by pouring it on or dipping these in. Once the excess has drained off, a 0.2 to 1 mm thick layer remains following the drying, depending on the viscosity of the clay suspension. Since the oxides used are cheap, as compared to the colored pigments, mixing them into the complete ceramic mass is an option.

Furthermore, it is possible to incorporate solutions of material, which result in the oxides with rutile lattice or spinel lattice during the firing, to evaporate the solution and to deposit the oxide host lattices on the inside surfaces by firing them. Insofar as the starting materials are hard to dissolve, a sufficient oxide concentration can be achieved through a multiple application of the solution and drying. Solutions of salts of the respective metal ions with inorganic and organic acids, or also complex compounds or chelates are preferably used. As preferred compounds must be mentioned chloride, sulfate, nitrate, acetate, oxalate or complexes with alkanol amines, such as diethanolamine or triethanol amine, hydroxycarboxylic acid, e.g. citric acid or lactic acid, and amino dicarboxylic acids, e.g. EDTA or NTA. Watery solutions are preferred insofar as the compounds are stable in water. Metal organic compounds such as titanium oxide, tin oxide or zirconium alkoxide or their phenolates or metallocenes such as titanium cyclopentadienyl complexes can be handled only in organic solvents and are therefore less suitable for technical coloring.

The coloring solution is preferably applied to the dried engobe layer or onto the ceramic containing the oxide host lattice, is dried once more and is subsequently fired at temperatures ranging from 1000 to 1400° C., preferably at the standard firing temperature of 1140° C. Alternatively, it is of course possible to fire on the engobe layer first and then fire it again after the coloring with the color solution, to produce the pigment coloration.

The coloring solutions for producing pigments of the rutile type consist of a water-soluble compound of a two-valent or three-valent metal ion, particularly from the group nickel, cobalt and chromium, as well as an additional soluble compound of a five-valent or six-valent metal ion, especially antimony, niobium or tungsten, wherein the salts are contained in a concentration of approximately 1 to 10 weight %, preferably 2 to 5 weight %. Organic acids and particularly complex-forming acids are preferably used as anions, which on the one hand have excellent dissolution characteristics and, on the other hand, burn off during the firing by forming water and $CO_2$, which protects the environment. Inorganic anions such as chloride or nitrate, however, can also be used if one wants to take into account the disadvantages associated with this.

Furthermore, it has turned out that mixing in potassium nitrate, sodium fluoride or similar substances, which act as mineralizers, promotes the formation of mixed-phase pigments, even in the clay matrix.

It has also proven advantageous to add complex-bound titanium, in particular potassium-titanium oxalate. However, the amounts are limited to less than 3% as a result of the low solubility of this compound. The mixed-phase coloring is improved through this admixture, possibly because of the growth of a mixed phase on the existing host lattices.

Recently, it has become known that titanium chelated through lactic acid (dihydroxy-bis[2-hydroxy propanato $(2^-)$-$O^1$, $O^2$]-titanate($2^-$)) as ammonium salt (CA-Reg. No. 85104-06-5) is hydro-stable in a watery solution for up to 50 weight %, corresponding to a titanium content of 8.2 weight %, and can be used as catalyst for curing plastics or as adhesive agent.

The Na and K compounds, as well as compounds with other ammonium ions exhibit similar stabilities. Surprisingly, these compounds can be mixed with salts of three-valent and five-valent ions in concentrations, which are standard for the mixed-phase formation of rutile lattices and are sufficient for a direct coloration of the ceramic surfaces, without the interaction of the various anions leading to an incompatibility. Organic acid residues such as acetate, tartrate, citrate or lactate are preferred as anions in these salts, since they are oxidized to $CO_2$ during the firing. However, inorganic salts such as chloride, sulfate or nitrate, can also be used. In that case, 1–3 weight % of the three-valent and the five-valent ions and 3–8 weight % of titanium are preferred. Smaller amounts of the three-valent to five-valent ions result in pale colors, smaller amounts of the titanium or higher amounts of the coloring compounds lead to oxidic mixed colors, which do not have the brilliance and shade of the rutile lattice. The formation of a rutile pigment with 10–60%, preferably 20–40%, of the chromophoric ions is therefore preferred.

The color solutions are applied through spraying, dipping, painting on or printing them onto those sections of the surface, which are to be colored, wherein the solutions penetrate the ceramic mass more or less deeply, depending on the amount of solution applied. Thus, discolorations generally occur up to a depth of 0.5 to 2 mm, so that it is possible to apply a pattern to the surface as well as process the surface by grinding it or polishing it.

Titanium oxide is preferably used as host lattice for rutile pigments, but $SnO_2$, $ZrO_2$ and other oxides suitable for this purpose can also be used.

Compounds such as $MgAl_2O_4$, $ZnAl_2O_4$ or $Zn(TiZn)O_4$, $Mg_2TiO_4$, $Zn_2TiO_4$ can be used as host lattice for spinels.

The organic ligands of the metal compound are burnt off as a result of the firing or the inorganic anions are evaporated and the remaining metal oxides are inserted into the silicate phase of the ceramic or into the specified host lattices by forming coloring pigments.

The mixed-phase pigments formed in accordance with the invention permit an extraordinary expansion of the spectrum for the subsequent coloring of ceramic surface layers and allow the targeted application of a plurality of new color shades.

Using the example for producing rutile pigments, the following experiments provide a better definition of the subject-matter of the invention without limiting it.

I. Color measuring

The resulting color shade was determined with the aid of a Minolta Chroma Meter CR 200, wherein the CIE standard light type C (6774K) was used. The L*a*b color system recommended in the ISO and DIN Standards was used to determine the values. The L*a*b color system represents a color body through which three axes extend. The vertical axis is the L* axis and stands for the brightness of the color. The a* and b* axes extend in the horizontal plane (color circle), wherein a* stands for the color shade and b* for the saturation. A typical lemon yellow, for example, has the brightness L* of 81.5, an a* value around 0 and a high b* value of 62.5.

II. Results of the firing experiments

Experiments with solutions on the basis of the elements Ti, Sb and Cr

Solutions containing antimonate and chromium(III) acetate, showed a yellowish color shade, which moved clearly in the direction of yellow if titanium was present. The admixture of oxidation means ($KNO_3$ or $K_2S_2O_8$) to improve the color depth resulted in a slight deepening of the color in antimony-containing formulas (Ti—Sb—Cr as well as Ti—Sb—Ni, the latter showing a brown shade).

In the Ti—Sb—Cr system, the influence of mineralizers such as NaF and oxidation means such as $KNO_3$ Was then examined. The examination showed that the color was weak, but clearly existed is relative to the blank value and showed up best in a formulation with all components (Ti—Sb—Cr, NaF, to im. Cr and Sb are both necessary, but Ti had only a weak effect and the same was true for NaF and $KNO_3$. This was also confirmed by varying the amounts of NaF and $KNO_3$ and by adding Pr to the formulation (via $Pr_2(CO_3)_3$ and citric acid): a clear effect was not obtained in any case.

The following formulations are preferred embodiments of the present invention:

III. Selected formulations:

Experiment 3: 21.27% K—Ti-oxide oxalate×2$H_2O$ (2.9% Ti); 8.05% Cr(III) acetate (1.64% Cr); 5.50% K—Sb-tartrate (2.00% Sb); 2% Na-gluconate; 63.2% distilled water Experiment 4: 8.05% Cr(III)acetate (1.64% Cr); 5.5% K—Sb-tartrate (2% Sb); 2.2% N-gluconate; 84.25% distilled water Experiment 18: 8.05% Cr(III)acetate (1.64% Cr); 5.5% K—Sb-tartrate (2% Sb) 21.27% K—Ti-oxalate (2.87% Ti); 3% $KNO_3$ Experiment 19: 8.05% Cr(III)acetate (1.64% Cr); 5.5% K—Sb-tartrate (2% Sb); 21.27% K—Ti-oxalate (2.87% Ti); 3% $(NH_4)_2S_2O_8$ Experiment 20: 8.05% Cr(III)acetate (1.64% Cr); 5.5% K—Sb-tartrate (2% Sb); 3% $KNO_3$ Experiment 21: 8.05% Cr(III)acetate (1.64% Cr); 5.5% K—Sb-tartrate (2% Sb); 3% $(NH_4)_2S_2O_8$ Experiment 37: 8.05% Cr(III)acetate (1.64% Cr); 5.5% K—Sb-tartrate (2% Sb); 1% NaF; 4.5% $KNO_3$ Experiment 39: 8.05% Cr(III)acetate (1.64% Cr); 5.5% K—Sb-tartrate (2% Sb); 21.27% K—Ti-oxalate; 4.2% $Pr_2(CO_3)_3$

TABLE 1

Color values according to the L*a*b* system

| solution No. | L* | a* | b* |
| --- | --- | --- | --- |
| blank value | 74 | −2.1 | +18 |
| 3 | 73.5 | −2.5 | +22 |
| 4 | 71.6 | −3.8 | +22.5 |
| 18 | 72 | −3.2 | +23.7 |
| 19 | 71.5 | −3.2 | +23.5 |
| 20 | 71.4 | −4.1 | +23 |
| 21 | 72 | −4 | +23 |
| solution No. | L* | a* | b* |
| blank value | 86 | −3.5 | +16 |
| 37 | 72 | −2.4 | +27.5 |
| 39 | 77 | −3 | +26 |

The above-described formulations were also fired at 1000° C. in addition to the standard firing temperature of 1140° C., wherein no color impression was obtained.

IV Engobe experiments

The above-listed experiments generally have the problem of a low concentration of titanium in watery solution (2.9%), which prevents a darkening of the color shade in that no larger portion of the surface is coated with a $TiO_2$ lattice. The so-called engobing technique offers one solution to this problem and consists of enriching the surface with $TiO_2$. The engobe shade in this case can be enriched either naturally or artificially with $TiO_2$.

For this purpose, an engobing mass of powdered clay FT-A (light firing) of the firm Fuchs'sche Tongruben in Ransbach was laced with 5 weight % of $TiQ_2$.

The powdered clay was processed as follows: the clay was ground in a ball grinder and screened with a strainer having a mesh width of 0.063 mm. The viscosity was regulated by using liquefiers (max. 0.1%) on a silicone or acrylate base. The blanks were then engobed by pouring the mass over them and letting them drip dry. Following the drying over night, the molded bodies obtained in this way were sprayed with the respective chromophoric solution and subsequently fired at 1140° C.

TABLE 2

| | 35% solids original | |
| --- | --- | --- |
| substance | percent share | example |
| clay FT-A | 24.5 | 183.75 g |
| Na feldspar | 4.9 | 36.75 |
| K feldspar | 0.35 | 2.63 |
| powdered quartz | 5.25 | 39.375 |
| water | 65 | 487.50 |
| Sum | 100 | 750 |

TABLE 3

35% solids original, modified

| substance | percent share | example |
|---|---|---|
| clay FT-A | 22.5 | 169 g |
| Na feldspar | 3.9 | 29 |
| K feldspar | 0.35 | 2.6 |
| powdered quartz | 3.25 | 24.4 |
| water | 65 | 487.50 |
| admixture | 5.0 | 27.5 |
| sum | 100 | 750 |

TABLE 4 admixtures: $TiO_2$, $ZnO$, $SnO_2$, $ZrO_2$

| engobe mass | L* | a* | b* |
|---|---|---|---|
| clay FT-A blank value | 81.5 | −4.2 | +16.2 |
| clay FT-A + GK 37 | 72.1 | +1 | +30.8 |
| clay FT-A/5% $TiO_2$ + GK 37 | 79.4 | −3.3 | +32 (light yellow) |
| clay FT-A + GK 39 | 73.9 | −3 | +27.2 |
| clay FT-A/5% $TiO_2$ + GK 39 | 76 | +3.5 | +42 (yellow) |
| clay FT-A/5% ZnO | 86.7 | 0.1 | +8.8 |
| clay FT-A/5% ZnO + GK39 | 80.8 | +2.8 | +14.7 |
| clay FT-A/5% $SnO_2$ | 86.1 | +0.7 | +14.3 |
| clay FT-A/5% $SnO_2$ + GK 39 | 79 | +2 | +20.4 |
| clay FT-A/5% $ZrO_2$ | 84.9 | +1 | +16 |
| clay FT-A/5% $ZrO_2$ +GK 39 | 75.9 | +2.1 | +26.2 |

V. Results:

A clear ochre-yellow coloring with a Cr/Sb color element resulted only when adding $TiO_2$.

Influence of $TiO_2$ on other color solutions:

Within certain limits, the coloring characteristics of other coloring solutions can also be influenced if $TiO_2$ is added to the material to be colored or an engobe mass. Thus, a cobalt chloride solution (1) (7 weight % of Co) and an iron (III) chloride solution (2) (9 weight % Fe) on the engobe mass results in different color shades, with our without 5% $TiO_2$.

TABLE 5

| engobe mass | L* | a* | b* |
|---|---|---|---|
| clay FT-A blank value | 81.5 | −4.2 | +16.2 |
| clay FT-A + (1) (Co) | 45 | −2.86 | −14.36 |
| clay FT-A/5% $TiO_2$ + (1) (Co) | 59.15 | −4.65 | −11.93 |
| clay FT-A + (2) (Fe) | 68.85 | +10.5 | +27.89 |
| clay FT-A/5% $TiO_2$ +(2) (Fe) | 78.12 | +0.81 | +29.13 |

$TiO_2$ clearly lightens the color and changes its quality in the case of iron, where a displacement from reddish-brown to yellowish occurs.

VI. Working $TiO_2$ into a ceramic mass:

A ceramic body with the following composition: $SiO_2$ 65–72%; $Al_2O_3$ 18–23%; $TiO_2$<=1; $Fe_2O_3$<=1; CaO 1–2; MgO<=1; $K_2O$ 2–4; $Na_2O$ 1–3; $Cr_2O_3$<=0.1; BaO<=0.1; $P_2O_5$<=0.1; loss on red heat 4–5.5, was ground, then laced with 5 weight % $TiO_2$, compressed and subsequently sprayed with the color solution obtained through experiment 37 and fired together with an untreated test piece. The results after firing are as follows:

TABLE 6

| Experiment | L* | a* | b* |
|---|---|---|---|
| blank value | 79.3 | −3.7 | +14.6 |
| 1 | 73.5 | −2.5 | +22 |
| 2 | 71.6 | −3.8 | +22.5 |

VII Coloring with a Ti/Cr/Sb solution

Ceramic bodies with a $TiO_2$ content of <0.1 weight % and otherwise a composition according to experiment VI, are sprayed with the following solutions, dried and fired at 1140° C.

| 38. | 2% Cr | (as chromium(III)acetate) |
|---|---|---|
| | 1.4% Sb | (as potassium antimony(III)tartrate) |
| | 8.8% Ti | (as dihydroxybis(ammoniumlactato)titanate - Tyzor LA ® - 40% in $H_2O$) |
| | rest | water |
| 39. | 1.5% Cr | (as chromium(III)acetate) |
| | 1.0% Sb | (as potassium antimony(III)tartrate) |
| | 4.0% Ti | (as dihydroxybis(ammoniumlactato)titanate - Tyzor LA ® - 40% in $H_2O$) |
| | rest | water |
| 40. | 2% Cr | (as chromium(III)acetate) |
| | 1.4% Sb | (as potassium antimony(III)tartrate) |
| | 2.5% Ti | (as titanium oxalate) |
| | rest | water |
| 41. | 2% Cr | (as chromium(III)acetate) |
| | 1.4% Sb | (as potassium antimony(III)tartrate) |
| | rest | water |
| 42. | 2% Cr | (as chromium(III)acetate) |
| | 4.0% Ti | (as dihydroxybis(ammoniumlactato)titanate - Tyzor LA ® - 40% in $H_2O$) |
| | rest | water |

TABLE 7

| Experiment | L* | a* | b* |
|---|---|---|---|
| blank value | 80.2 | 0.85 | 7.9 |
| 38 | 75.95 | 1.65 | 25.4 |
| 39 | 75.5 | 0.9 | 27.9 |
| 40 | 74.4 | 2.5 | 21.3 |
| 41 | 73.8 | 1.9 | 19.5 |
| 42 | 72.5 | −4.5 | 20.3 |

The solutions containing the ternary mixture are the only ones resulting in a satisfying yellow coloration owing to the rutile mixed-phase lattice that forms. The solution without titanium results in a dirty orange color shade, whereas the solution without antimony results in a pale, yellow-green coloration.

What is claimed is:

1. A method for coloring a surface of a ceramic mass to produce a colored ceramic body, the method comprising:

(a) providing a host lattice material comprised of a colorless metal oxide compound which crystallizes when fired into one of a spinel lattice or a rutile lattice and which may be water soluble;

(b) providing an aqueous coloring solution comprising water; a first water soluble compound including a metal ion which is one of a two-valent metal ion or a three-valent metal ion and which colors the host lattice material; and a second water soluble compound including a metal ion which is one of a five-valent metal ion or six-valent metal ion and which provides electrostatic balance;

(c) treating the surface of the ceramic mass by one of:
  i. working a fine powder of the colorless metal oxide into the ceramic mass and applying the aqueous coloring solution onto at least one surface of the ceramic mass, or
  i.i. adding a water soluble colorless metal oxide compound to the aqueous coloring solution in an amount effective to form a mixture having a preselected viscosity and applying this mixture to the surface of the ceramic mass;
(d) drying the solution; and
(e) firing the ceramic body at a temperature ranging from 300 to 1400° C. for a duration ranging from 0.5 to 5 hours to generate a mixed-phase pigment in the surface of the ceramic mass and thereby color the surface of the ceramic mass and produce the colored ceramic body.

2. The method according to claim 1 wherein the host lattice material forms a rutile lattice composed a colorless metal oxide compound which is selected from the group consisting of $TiO_2$, $SnO_2$, $ZrO_2$ and $ZrSiO_4$.

3. The method according to claim 1, wherein the host lattice material is present in an amount ranging from 2 to 10 weight %, based on the weight of the mixed-phase pigment.

4. The method according to claim 3, wherein the host lattice material is present in an amount of 5 weight %, based on the weight of the mixed phase pigment.

5. The method according to claim 1, further comprising repeating steps (c) and (d) one or more times in sequence prior to step (e).

6. The method according to claim 1, wherein the aqueous coloring solution contains from 1 to 10 weight % of the respective ones of the first and second water soluble compounds.

7. The method according to claim 6, wherein the aqueous coloring solution contains from 5 to 8 weight % of the respective ones of the first and second water soluble compounds.

8. The method according to claim 1, wherein the metal ion for the first water soluble compound is an ion selected from the group consisting of ions of Ni, Co and Cr, and wherein the metal ion for the second water soluble compound is an ion selected from the group consisting of ions of Sb, Nb and W.

9. The method according to claim 1, wherein the aqueous coloring solution further comprises mineralizers.

10. The method according to claim 1, wherein the aqueous coloring solution further comprises a coordinated titanium.

11. The method according to claim 10, wherein the coordinated titanium is potassium titanium oxalate.

12. The method according to claim 10, wherein the aqueous coloring solution is a saturated solution and contains from 1–3 weight % of the three-valent metal ions and five-valent metal ions, and from 3–8 weight % of the coordinated titanium which is dihydroxybis (ammoniumlactato) titanate.

13. A colored ceramic body having a surface colored with a mixed-phase pigment provided in the surface and produced by the method according to claim 1, wherein the mixed-phase pigment comprises a host lattice comprised of an initially colorless metal oxide compound which has been crystallized into one of a spinel lattice or a rutile lattice by firing and a first water soluble compound including a metal ion which is one of a two-valent metal ion or a three-valent metal ion and which colors the host lattice material; and a second water soluble compound including a metal ion which is one of a five-valent metal ion or six-valent metal ion and which provides electrostatic balance to the host material.

* * * * *